United States Patent [19]

Kupperman et al.

[11] 4,105,349

[45] Aug. 8, 1978

[54] MECHANISM FOR FORMING A LOOP IN A ROPE OR THE LIKE

[75] Inventors: Sam Kupperman, Chicago; Dennis I. Kupperman, Glenview, both of Ill.

[73] Assignee: R B Toy Development Co., Skokie, Ill.

[21] Appl. No.: 733,332

[22] Filed: Oct. 18, 1976

[51] Int. Cl.² .................. F16G 11/00; F16G 11/14
[52] U.S. Cl. .................. 403/209; 24/129 R
[58] Field of Search ............ 24/129 R, 129 A, 129 B, 24/129 D, 18; 272/DIG. 4, 126; 403/209

[56] References Cited

U.S. PATENT DOCUMENTS

| 51,582 | 12/1865 | Gibbs | 24/129 R |
|---|---|---|---|
| 122,135 | 12/1871 | Taylor | 24/129 R |
| 283,719 | 8/1883 | Mosher | 24/129 R |
| 413,135 | 10/1889 | Dennis | 24/129 R |
| 2,092,239 | 9/1937 | Bergloff | 24/129 R |
| 3,409,014 | 11/1968 | Shannon | 24/129 B |

FOREIGN PATENT DOCUMENTS

| 498,743 | 2/1951 | Belgium | 24/49 S |
|---|---|---|---|
| 575,601 | 5/1959 | Canada | 24/129 R |
| 1,029,429 | 5/1966 | United Kingdom | 24/129 |

*Primary Examiner*—Bernard A. Gelak
*Attorney, Agent, or Firm*—Vogel, Dithmar, Stotland, Stratman & Levy

[57] ABSTRACT

Locking means comprising a plate with a plurality of spaced openings through which the free end of a flexible member, such as a rope or cord, is strung through, to form an adjustable loop exteriorly of the locking plate, so that the flexible member can serve as an anchoring, mooring, tethering or suspension line. The locking plate has a projection which engages the flexible member as tension is applied to the flexible member to prevent movement of the flexible member relative to the locking plate. The effective length of the flexible member being adjustable.

4 Claims, 5 Drawing Figures

U.S. Patent  Aug. 8, 1978  4,105,349
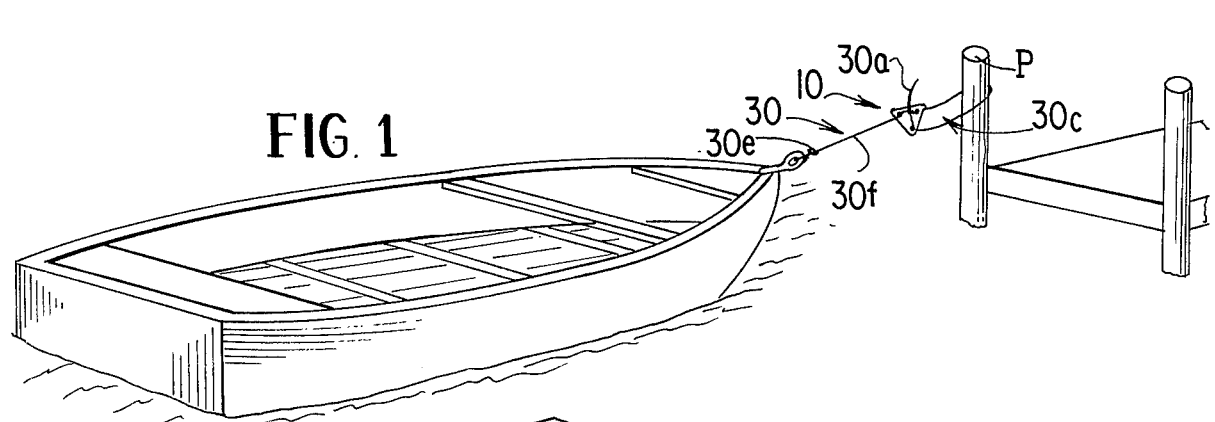
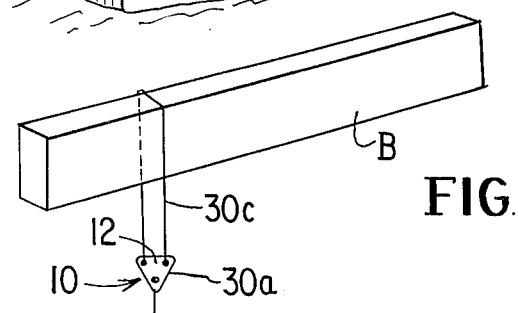
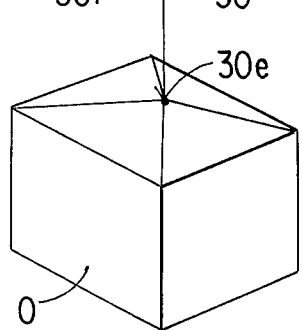
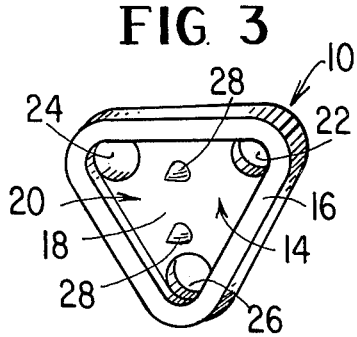
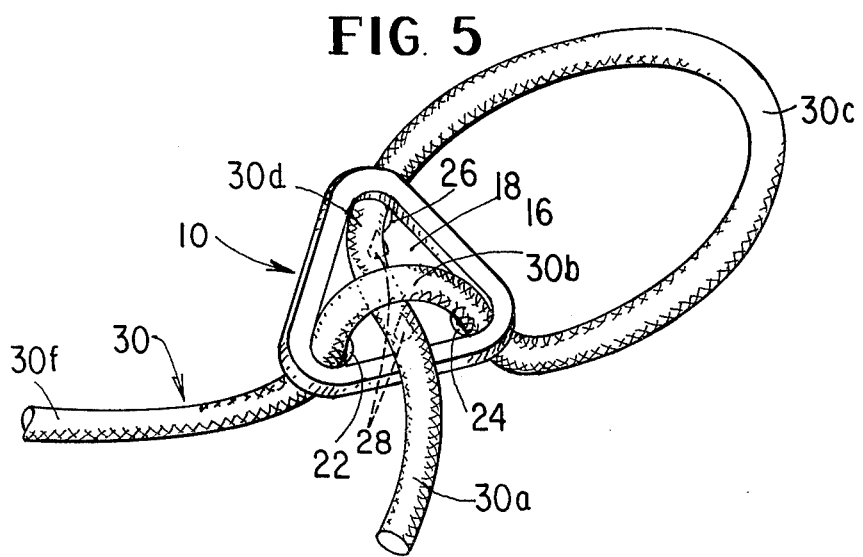

MECHANISM FOR FORMING A LOOP IN A ROPE OR THE LIKE

The invention herein is shown and described in applicants' copending application Ser. No. 626,294, filed Oct. 28, 1975 now U.S. Pat. No. 3,999,752.

BRIEF SUMMARY OF THE INVENTION

One of the objects of this invention is to provide locking means for securement to a flexible member, such as rope or cord, whereby the flexible member forms at the free end thereof an adjustable loop to permit the adjustable loop to be held or be attached to some member, so that an object which is secured to the opposite end of the flexible member can be anchored, moored, tethered or held suspended.

Another object of this invention is to provide a very simple and inexpensive locking plate integrally formed of plastic material which permits a rope or cord to be attached thereto so that one end of the rope or cord may be formed into an adjustable looped portion, which looped portion may be held, or may be anchored or secured so that the rope or cord forms an anchoring, mooring or tethering line or a suspension line. The locking plate is detachably secured to the rope or cord anywhere along the length of same so that the position of the looped portion relative to the length of the rope or cord may be as desired to thereby lengthen or shorten the effective length of the rope or cord.

Another object is to provide a locking plate with a plurality of spaced openings and projecting means whereby a cord or rope is strung through the openings and engages the projecting means to form a looped end adjacent the locking plate, which looped end is maintained in a locked position by the locking plate without the use of extraneous fastening means. The locking plate permits adjustment of the size of the looped end and also permits positioning of the locking plate anywhere along the length of the cord or rope to increase or decrease the effective length of the cord or rope.

BRIEF DESCRIPTION OF THE DRAWINGS

FIG. 1 is a view showing the locking means of the invention used with a cord whereby the cord forms a mooring line for anchoring a boat or the like to a dock.

FIG. 2 is a view showing the use of this invention with a cord which forms a suspension line whereby an object may be suspended.

FIG. 3 is a perspective view of the locking member as viewed from the top or front side.

FIG. 4 is a view of said locking member as viewed from the rear or bottom side.

FIG. 5 is an enlarged view showing the cord or rope associated with the locking member of this invention.

DESCRIPTION OF THE PREFERRED EMBODIMENTS

The locking plate forming this invention is generally designated at 10 and is preferably integrally molded of plastic, although not limited to such material. It is shaped to form an equilateral triangle with rounded corners and has a back side 12 and a front side 14. The back side is substantially flat or planar and the front side is formed with a continuous raised border 16 which with the front wall 18 forms a triangularly-shaped well 20 or recess on the front side 14 of the locking plate.

A hole or opening is formed in the triangular plate adjacent each of the three corners, said holes or openings are indicated by the numerals 22, 24 and 26 and are positioned to extend inside the continuous raised border 16. Extending upwardly of the front wall 18 are a pair of spaced projections 28 which are generally cone-shaped with pointed ends. The pointed ends are on the same plane as the top of the border 16.

The cord or rope which is to be used with the locking plate 10 is generally indicated at 30 and is formed preferably of nylon or plastic. As best seen in FIG. 5, the free end 30a of the cord is inserted into the opening 22 of the locking plate through the back side, and passed upwardly and across the top and then down through the opening 24, thereby forming a short cross-over portion 30b extending between the openings 22 and 24 on the front side. The free end of the cord is then looped to form a loop 30c and the cord is then passed upwardly through the opening 26 to the front side and passes over the front wall 18 so that the portion 30d of the cord is then positioned under the short cross-over portion 30b and then terminates in the free end 30a outwardly of the locking plate. The portion 30d of the cord which lies on the front wall 18 passes over and is engaged by the projections 28.

The opposite end 30e of the cord being suitably attached as in FIG. 1 to an object such as a boat or as in FIG. 2 to an object which is to be held supported or suspended by the cord. The loop portion 30c of the cord which is formed by the locking plate 10 is used as in FIG. 1 to be secured to a beam or post P on a pier and the cord serves as a mooring or tethering line for securing the boat. In the illustration shown in FIG. 2, the cord may serve as a suspension line to support an object O in suspended position with the looped portion 30c of the cord attached to a beam B or to a hook mounted on a wall or the like.

The looped portion 30c is adjustable in that the size of the loop 30c can be increased or decreased merely by moving the free end 30a of the cord 30 relative to the locking plate 10. Likewise the effective length of the cord, which effective length is indicated by the numeral 30f and is the distance between the opposite end 30e and the locking plate 10, may be increased or decreased by the positioning of the locking plate with respect to the cord. For example, if the effective length 30f of the cord is to be increased from that shown, then the locking plate 10 is positioned a further distance on the cord away from the opposite end 30e. For shortening the effective length, the locking plate is positioned closer to the opposite end 30e of the cord. Thus, the effective length 30f of the cord and the looped portion 30c may be adjusted so that a cord having the maximum length may be used to its maximum length, or it may be shortened, and this is likewise true where the looped portion 30c may be increased or decreased.

In FIG. 1 the loop portion 30c of the cord is shown secured around a post P for anchoring or mooring a boat which is secured to the opposite end of the cord. As the anchored boat moves in the water away from the looped end 30c, it will tighten or pull on the cord against the locking plate 10 and against the looped portion 30c which thereby tightens the cord relative to the locking plate 10 with the projections 28 embedding themselves in the cord to lock the cord relative to the locking plate 10 and to prevent any sliding movement of the cord relative to the locking plate 10.

FIG. 2 shows the cord and locking plate used for suspending an object O. The weight of the suspended object will place a pull on the cord acting against the looped portion 30c to lock the cord relative to the locking plate 10. The length of the cord and the looped portion may be adjusted by means of the locking plate forming this invention.

What is claimed is:

1. Means for securement to a flexible member, such as a rope or cord or the like, to form a loop in said flexible member with said flexible member having a free end, said means comprising an equilateral triangularly shaped locking plate having an opening therethrough adjacent each corner thereof, an upstanding border surrounding said plate and encircling said openings, a projection on said plate extending upwardly therefrom intermediate said openings, a portion of the flexible member extending over said plate between a pair of said openings and the free end of the flexible member extending through the other opening underneath the said portion of the flexible member and in contact both with the upstanding border and the projection.

2. Means for securement to a flexible member, such as a rope or cord or the like, to form a loop in said flexible member with said flexible member having a free end, said means comprising a locking plate having three openings therein forming a triangle, an upstanding rib on said plate extending around the triangle formed by said openings, a projection extending upwardly from the surface of said plate positioned substantially midway between a pair of said openings, a portion of the flexible member extending over the plate and through the pair of spaced openings and the free end of said flexible member extending beneath the portion of the flexible member in contact with the upstanding rib, the abutment and passing through the other opening.

3. The means set forth in claim 2, wherein the projection comprises a plurality of upstanding conical members at least one of which is midway between the pair of openings.

4. The means set forth in claim 2, wherein the projection comprises a pair of upstanding members one being positioned midway between the pair of openings and the other being positioned adjacent the other opening and forming a line with the other projection and the other opening.

* * * * *